United States Patent Office 3,526,591
Patented Sept. 1, 1970

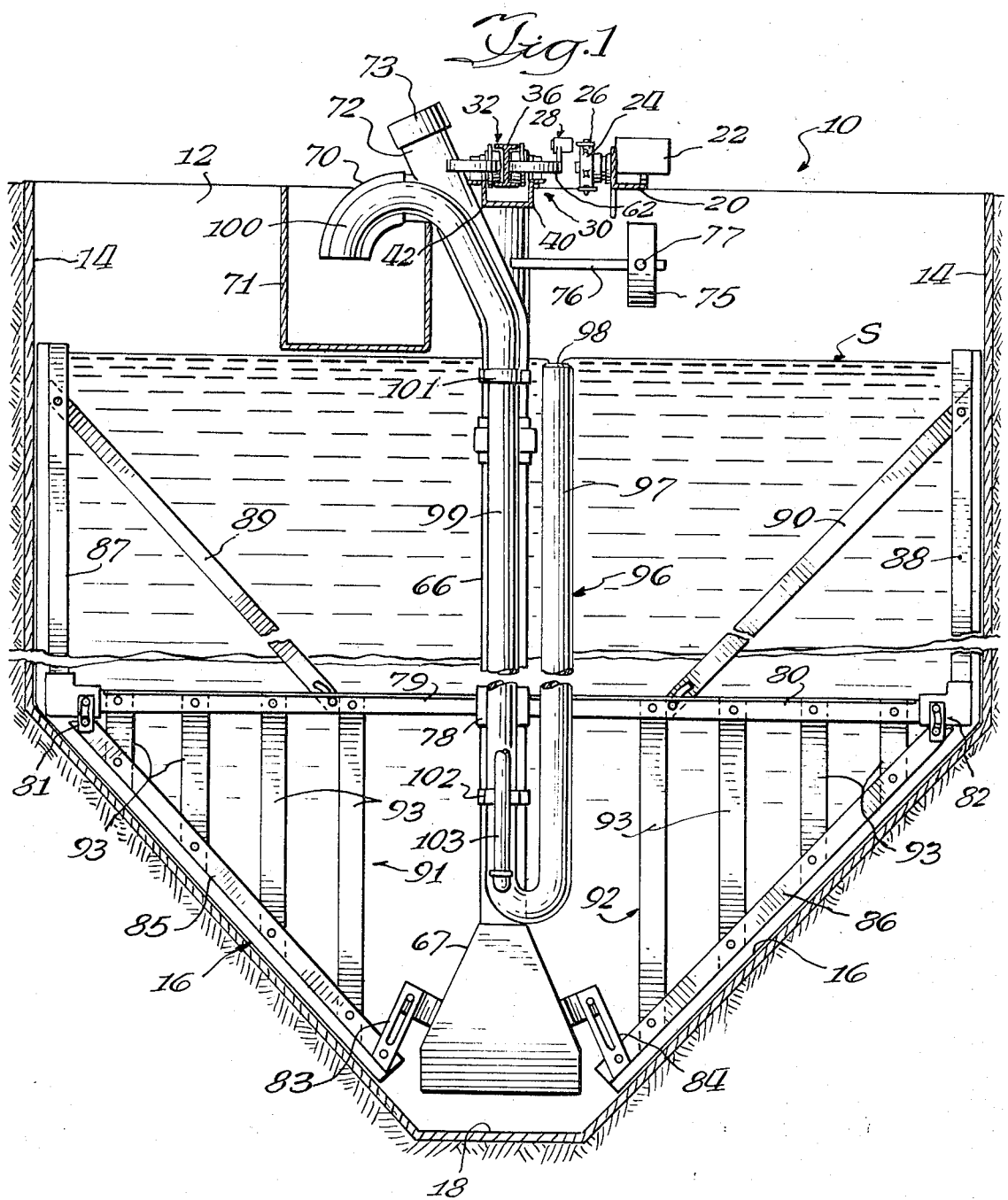

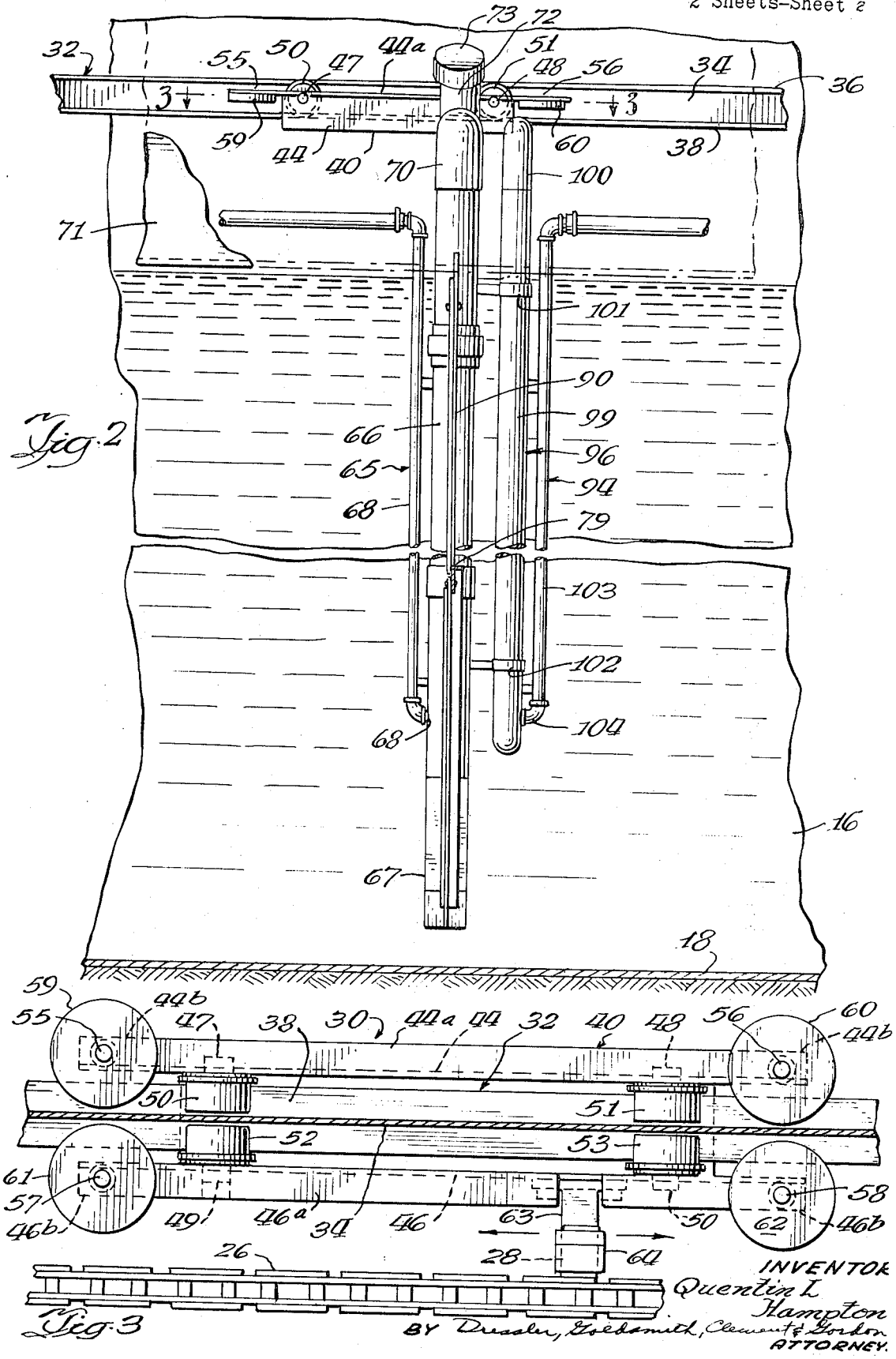

3,526,591
SEWAGE TREATMENT STRUCTURE
Quentin L. Hampton, Ormond Beach, Fla., assignor to
FMC Corporation, a corporation of Delaware
Filed Feb. 28, 1969, Ser. No. 803,378
Int. Cl. B01d 21/12, 21/18, 21/24
U.S. Cl. 210—525                                14 Claims

ABSTRACT OF THE DISCLOSURE

An improved traveling air lift structure for pumping sludge from the bottom of a settling tank is disclosed, with the air lift structure including a novel trolley structure mounting the air lift for movement relative to the settling tank, a novel stirring blade structure for preventing the sludge from bridging upon itself at the bottom of the tank, and an improved scum skimming device for skimming scum from the top surface of the aerated sewage within the tank.

BACKGROUND OF THE INVENTION

The invention disclosed herein represents an improvement upon the structures disclosed and claimed in Hampton Pats. Nos. 3,132,773 and 3,234,880. The present invention is also related to the process and apparatus disclosed and claimed in Forest Pat. No. 3,396,102.

It is known from the above-mentioned patents to mount a traveling air lift pumping structure within a settling tank, so that the pumping means of the air lift structure lifts sludge from the bottom of a settling tank and transfers it to a discharge zone, such as an aeration tank or a trough that leads to an aeration tank. From the above patents, it is also known to provide a skimming structure for removing scum that accumulates at the upper surface of the liquor in the settling tank and transferring it to a discharge zone. Prior art arrangements have included squeegee members that are movable with the air lift structure for scraping the inclined portions of the tank bottom wall, so that the sludge will accumulate at a central horizontally disposed portion of the bottom wall where it is lifted by the air lift pump. Prior art traveling air lifts have conventionally been supported upon an I-beam, or other suitable support member, with vertically disposed wheels tracking the lower flange of the I-beam during movement of the traveling air lift back and forth across the settling tank.

While the prior art structures discussed above have functioned generally satisfactorily, several problems have arisen in connection with their use. For example, it has been found that when the air lift structure is supported solely by vertically disposed tracking wheels, no structure is provided for resisting side to side movement of the wheels, so that the wheels tend to wear excessively. Furthermore, side to side movement of the air lift assembly makes the scraping action of the squeegees erratic.

Prior art scum skimming structures have conventionally utilized the same source of compressed air as the sludge air lift pumping means, with the scum being pumped into the sludge discharge conduit. This arrangement has not been satisfactory, in that the scum skimming rate is entirely dependent upon the sludge pumping rate. It has been found that at moderate or low sludge return rates, prior art skimming mechanisms are entirely unsatisfactory, and in fact, they will only function properly when sludge is being returned at a maximum rate.

In the use of prior art structures, in some instances it has also been found that the settled activated sludge becomes dense enough to bridge upon itself, so that the sludge pump suction moves sludge only from the cross sectional area immediately surrounding the inlet end of the sludge pump air lift conduit. Obviously, when this occurs, the sludge becomes inactive after a relatively short period of time.

SUMMARY OF THE INVENTION

The improved traveling air lift structure of the present invention obviates the problems discussed above by providing an improved trolley structure for supporting the traveling air lift upon a beam in a manner that eliminates side to side movement of the air lift assembly. More particularly, the improved trolley structure includes a pair of horizontally disposed guide wheels on each side of the web of the support beam, with the horizontally disposed guide wheels bearing against the web to effectively prevent side to side movement of the air lift unit. The present invention also includes an improved scum skimming mechanism that travels with the air lift structure to skim across essentially the entire length of the settling tank. The outlet end of the skimming structure is arranged to discharge the skimmings into a sludge return trough that is supported within the settling tank, and which receives sludge from the air lift pumping mechanism. The skimming mechanism is operated by an air lift pumping means that is separate and distinct from the pumping means associated with the sludge removal device, so that the skimming rate can be controlled independently of the sludge removal rate. To obviate the problem of sludge bridging at the bottom of the settling tank, stirring members are associated with the squeegees that scrape the inclined portions of the bottom wall of the tank, and the stirring members are effective to stir the settled sludge so that it will fall uniformly into a position where it will be lifted by the suction of the sludge pumping mechanism. The present invention also includes further squeegee members that scrape the side walls of the settling tank to prevent particles of sludge from adhering thereto.

BRIEF DESCRIPTION OF THE DRAWINGS

FIG. 1 is a central sectional view through a settling tank having the improved air lift structure of the present invention mounted therein;

FIG. 2 is a side elevational view of the structure illustrated in FIG. 1, with certain portions broken away for clarity of illustration; and FIG. 3 is an enlarged fragmentary plan view illustrating the improved trolley structure of the present invention.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

In the drawings, the numeral 10 indicates a settling tank of suitable material of construction, and tank 10 is adapted to receive aerated sewages from an aeration tank, not shown. Settling tank 10 includes upright end walls 12, upright side walls 14, and a bottom wall having inclined portions 16 and a horizontal midportion 18.

End walls 12 support a longitudinally extending beam member 20, and a power source such as an electric motor 22, is secured to and supported on beam member 20. The drive shaft of motor 22 is connected by a suitable coupling to the input shaft of a gear reduction unit, which has a sprocket 24 mounted upon the output shaft thereof, as is well known. An idler sprocket (not shown) is rotatably mounted on beam 20 at a location spaced from sprocket 24, and an endless chain 26 is trained over the sprockets, with a pin 28 extending outwardly from chain 26 and fixed to a trolley 30. Trolley 30 is mounted for movement upon a longitudinally extending beam 32 that is supported upon end walls 12, with beam 32 including a central web 34, upper flanges 36, and lower flanges 38. Electric motor 22, which drives chain 26, may be of a reversing type whose rotation in each direction is controlled by limit switches, but if desired, mechanical means for periodic reversal of direction of movement of endless chain 26 may also be used.

Trolley 30 includes a frame 40 of upwardly open U-shaped cross section, with frame 40 having a bottom 42 which is disposed beneath the beam member 32 and sides 44 and 46 which straddle and are spaced from said beam member. Side 44 of trolley 30 has inwardly extending horizontal axles 47 and 48 and side 46 has inwardly extending horizontal axles 49 and 50, respectively, journaled adjacent each end thereof. Axles 47, 48, 49 and 50 support follower means in the form of vertically disposed flanged wheels 51, 52, 53 and 54, respectively. The flanged wheels straddle the web 34 of beam member 32 and rest upon the bottom flange 38 thereof. Flanges 44a and 46a extend outwardly from the upper edge of sides 44 and 46, respectively, and flanges 44a and 46a include outrigger portions 44b and 46b, respectively, that extend beyond sides 44 and 46. Vertical axles 55 and 56 extend downwardly from flange portions 44b, and vertical axles 57 and 58 extend downwardly from flange portions 46b; and further follower means in the form of horizontally disposed wheels 59, 60, 61 and 62 are rotatably mounted upon axles 55, 56, 57 and 58, respectively. The engagement of wheels 51–54 with flanges 38 retains the trolley 30 in a true horizontal plane, while the engagement of wheels 59–62 with web 34 resists side to side movement to retain the trolley in a true vertical plane. Thus, as the trolley 30 travels on beam 32 back and forth above the open top of tank 10, the arrangement of the beam tracking wheels prevents the wheels from erratic sliding movement and subsequent wearing. A bracket 63 is secured to the side 46 of trolley 30, and a sleeve 64 on bracket 63 receives pin 28 therein to couple the trolley to the chain 26.

A pump 65 of a conventional air lift type is supported by trolley 30 in a position suspended below the beam member 32. The pump 65 includes an elongated conduit 66 having a footpiece 67 at the lower end thereof positioned adjacent the horizontal bottom portion 18 of the tank 10. Footpiece 67 is of such a size that it extends nearly across the bottom portion 18, and footpiece 67 has an inlet port (not shown) in the form of a slot in the bottom thereof.

Intermediate its ends, the conduit 66 is provided with a coupling 68, and a port extends through the coupling 68 and communicates with the interior of conduit 66. A hose 69 leads upwardly from the coupling 68, and connects with a conventional source of compressed air, not shown, which is positioned externally of the tank 10 for supplying the air for operating the pump 65 to create a suction. The conduit 66 includes an outlet branch 70, which is illustrated as discharging into a trough 71 that is supported on end walls 12. Conduit 66 further includes an upwardly extending access branch 72, and a cap 73 is removably mounted upon the upper end of branch 72, as by a threaded connection, so that the conduit is readily accessible for cleaning, when necessary. A counterweight 75 is secured to the air lift pump on the side opposite from branches 70 and 72 to balance the air lift assembly, and counterweight 75 may be secured at a suitable position of adjustment along support rod 76 by a set screw 77.

Conduit 66 is provided with a collar 78 from which support arms 79 and 80 extend substantially horizontally. Slotted brackets 81 and 82 are pivotally connected to arms 79 and 80, respectively, adjacent the outer end thereof, and slotted brackets 83 and 84 are pivotally connected to footpiece 67 adjacent the bottom of tank 10. A first squeegee member 85 is connected between brackets 81 and 83, and a second squeegee member 86 is connected between brackets 82 and 84, with squeegee members 85 and 86 being positioned in sludge scraping relationship with respect to the inclined portions 16 of the bottom wall of tank 10. The slotted brackets 82 and 84 allow the squeegee members 85 and 86 to be secured at suitable positions of adjustment relative to inclined portions 16. Further squeegee members 87 and 88 extend upwardly from the outer end of arms 79 and 80, with the squeegee members 87 and 88 being positioned in sludge scraping relationship with respect to the side walls 14 of tank 10. Squeegee members 87 and 88 are supported by inclined structural brace members 89 and 90, respectively, the lower ends of which make a slotted connection with arms 79 and 80, respectively.

Sludge stirring means 91 and 92 are provided between arm 79 and squeegee member 85 and arm 80 and squeegee member 86, respectively. The stirring means are each defined by a plurality of vertically extending, transversely spaced picket-like stirring members 93 that are connected at their lower end to the squeegee members, and that make a slotted connection at their upper end to the support arms. Stirring members 93 effectively prevent the sludge from bridging at the lower end of the settling tank, so that the stirred sludge will fall uniformly adjacent the horizontal portion 18 of the tank where it is lifted by the pumping means 65.

An air lift pumping means 94 for skimming scum from the top surface of the aerated sewage S is mounted for movement with the trolley 30. To this end, the pumping means 94 includes a generally U-shaped conduit 96 that includes a vertically disposed first leg 97 having an open scum inlet 98 at the upper end thereof that is arranged to travel beneath and adjacent the liquid level in tank 10 for skimming scum therefrom. Conduit 96 includes a second vertically disposed leg 99 having an outwardly bent upper end 100 that is arranged to discharge the skimmings into trough 71. Conduit 96 may conventionally be mounted for movement with trolley 30 by vertically spaced sleeves 101 and 102 that are connected to conduit 66. In order that the rate of scum withdrawal can be controlled independently of the rate of sludge removal, conduit 96 is connected to a separate source of compressed air, not shown, through a pipe 103 that is connected adjacent the lower end of the leg 99 of conduit 96 by a fitting 104. The separate source of compressed air enables effective skimming to take place, even at low rates of sludge removal.

What is claimed is:

1. In combination with an air lift pump including a conduit having a lower inlet end adapted to be disposed adjacent the bottom of a liquid containing tank and an outlet end adapted to discharge into a discharge zone, means for supplying air under pressure to said conduit above and adjacent said inlet end for extracting sludge from the tank bottom, and means for moving said air lift pump back and forth in said tank; a scum conduit mounted for movement with said air lift pump, said scum conduit having an upper inlet end adapted to be disposed beneath and adjacent the liquid level in the tank for skimming scum therefrom, said scum conduit having an outlet end positioned in discharging relationship with respect to said discharge zone, said scum conduit defining a scum flow path that is completely separate from the sludge flow path, and independently controllable means, separate and distinct from the means for supplying air under pressure to said air lift pump conduit, for applying a suction to said scum conduit inlet end for drawing scum into said scum conduit and forcing the same to said scum conduit outlet end.

2. The combination set forth in claim 1 wherein said discharge zone is defined by a trough supported within said tank.

3. The combination set forth in claim 1 including a trolley assembly adapted to be mounted for back and forth movement on a support member having a generally vertically disposed web portion and flange portions that extend outwardly from the lower end of said web portion, said trolley assembly including a carriage member having first and second spaced generally vertically disposed follower members each adapted to track along one of said flanges and third and fourth spaced generally horizontally disposed follower members each adapted to engage one side of said web.

4. For use in a settling tank having upright side and end walls, and a bottom wall having inclined portions that slope toward a central horizontally disposed portion, a traveling air lift comprising: a support member extending between said end walls, said support member including a generally vertically disposed web portion and flange portions extending outwardly from the lower end of said web portion; a trolley assembly mounted for back and forth movement on said support member, said trolley including a carriage member having first and second spaced generally vertically disposed follower members on each side of said web and adapted to track along said flanges, said carrier member also having third and fourth spaced generally horizontally disposed follower members engaging said web on opposite sides thereof; means connected to said carrier member for reciprocating the same back and forth along said support member; sludge removal means extending downwardly from said carrier member and having a sludge inlet end positioned adjacent the horizontal portion of said bottom wall and a sludge outlet end positioned in discharging relationship with respect to a discharge zone; means for supplying air under pressure above and adjacent to said inlet end for extracting sludge from the bottom of said tank; squeegee members movable with said carrier member and positioned in sludge scraping relationship with respect to the inclined portions of said bottom wall; and stirring members extending upwardly from said squeegee members.

5. An air lift as set forth in claim 4 including further squeegee members movable with said carrier member and positioned in sludge scraping relationship with respect to said side walls.

6. An air lift as set forth in claim 4 wherein said follower members are guide wheels rotatably mounted on said carrier member.

7. An air lift as set forth in claim 6 wherein said third and fourth follower members are spaced outwardly of said first and second follower members.

8. For use in a settling tank having upright side and end walls, and a bottom wall having inclined portions that slope toward a central horizontally disposed portion, a traveling air lift comprising: support means extending between the end walls of said tank; carrier means mounted on said support means; means for reciprocating said carrier means back and forth on said support means; sludge removal means extending downwardly from said carrier means, said sludge removal means having an inlet end positioned adjacent the horizontally disposed portion of the bottom wall of said tang and outlet means positioned in discharging relationship with respect to a discharge zone; squeegee members connected to said sludge removal means and positioned in sludge scraping relationship with respect to the inclined portions of said bottom wall; and a plurality of spaced stirring members extending upwardly from said squeegee members.

9. An air lift as set forth in claim 8 including a transversely extending brace member connected to said stirring members.

10. An air lift as set forth in claim 9 including further squeegee members positioned in sludge scraping relationship with respect to said side walls, and inclined support members extending between said brace member and said last-mentioned squeegee members.

11. An air lift as set forth in claim 8 including means movable with said carrier member for skimming scum from the upper level of liquid in the tank.

12. An air lift as set forth in claim 11 wherein said scum skimming means includes a generally U-shaped conduit having a scum inlet at the upper end of one leg thereof and a scum outlet adjacent the upper end of the other leg thereof; and means, separate and distinct from said sludge removal means, for applying a suction to the inlet of said conduit.

13. In combination with an air lift pump including a conduit having a lower inlet end adapted to be disposed adjacent the bottom of a liquid containing tank and an outlet end adapted to discharge into a discharge zone, means for supplying air under pressure to said conduit above and adjacent said inlet end for extracting sludge from the tank bottom, and means for moving said air lift pump back and forth in said tank; a generally U-shaped scum conduit mounted for movement with said air lift pump, a first leg of said scum conduit having an upper inlet end adapted to be disposed beneath and adjacent the liquid level in the tank for skimming scum therefrom, a second leg of said scum conduit having an outlet end at the upper end thereof positioned in discharging relationship with respect to said discharge zone, and means, separate and distinct from the means for supplying air under pressure to said air lift pump conduit, for applying a suction to said scum conduit inlet end for drawing scum into said scum conduit and forcing the same to said scum conduit outlet end.

14. The combination set forth in claim 13 wherein said suction applying means includes means for supplying air under pressure to the second leg of said U-shaped conduit.

References Cited

UNITED STATES PATENTS

| | | | |
|---|---|---|---|
| 2,094,552 | 9/1937 | Scott | 210—530 X |
| 3,396,102 | 8/1968 | Forrest | 210—525 X |

JAMES L. DeCESARE, Primary Examiner

U.S. Cl. X.R.

210—527